US012308987B2

(12) United States Patent
Swerdlow

(10) Patent No.: US 12,308,987 B2
(45) Date of Patent: *May 20, 2025

(54) TOPIC RELEVANCE DETECTION IN VIDEO CONFERENCING

(71) Applicant: Zoom Communications, Inc., San Jose, CA (US)

(72) Inventor: Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,498

(22) Filed: Jan. 18, 2024

(65) Prior Publication Data

US 2024/0154830 A1    May 9, 2024

Related U.S. Application Data

(63) Continuation of application No. 17/443,950, filed on Jul. 28, 2021, now Pat. No. 11,916,687.

(51) Int. Cl.
*H04L 12/18* (2006.01)
*G06F 40/279* (2020.01)
*G06F 40/30* (2020.01)
*G06N 20/00* (2019.01)
*G10L 15/08* (2006.01)
*G10L 15/18* (2013.01)
*G10L 15/26* (2006.01)

(52) U.S. Cl.
CPC ......... *H04L 12/1818* (2013.01); *G06F 40/30* (2020.01); *G06N 20/00* (2019.01); *G10L 15/1815* (2013.01); *H04L 12/1822* (2013.01); *H04L 12/1831* (2013.01); *G06F 40/279* (2020.01); *G10L 2015/088* (2013.01); *G10L 15/26* (2013.01)

(58) Field of Classification Search
CPC ....... G06F 40/279; G06F 40/30; G06N 20/00; G10L 15/1815; G10L 15/26; G10L 2015/088; H04L 12/1818; H04L 12/1822; H04L 12/1831

See application file for complete search history.

(56) References Cited

U.S. PATENT DOCUMENTS

| 8,370,142 B2 | 2/2013 | Frankel et al. |
| 9,087,521 B2 | 7/2015 | Reynolds |
| 10,002,345 B2 | 6/2018 | Ganani |
| 2006/0224430 A1 | 10/2006 | Butt |

(Continued)

FOREIGN PATENT DOCUMENTS

| WO | 2019148583 A1 | 8/2019 |
| WO | 2020242449 A1 | 12/2020 |

*Primary Examiner* — Thomas J Dailey
(74) *Attorney, Agent, or Firm* — Young Basile Hanlon & MacFarlane, P.C.

(57) ABSTRACT

A conference system automatically detects a topic in a discussion between two or more participants in a conference based on a transcription of an audio component of the conference. The conference system determines that the discussion is a side conversation based on a determination that the topic is not related to any discussion points of the conference. The conference system determines which participants are related to the side conversation and schedules a future conference between these participants. The conference system generates one or more discussion points for the future conference based on the topic.

20 Claims, 7 Drawing Sheets

(56) References Cited

U.S. PATENT DOCUMENTS

| | | |
|---|---|---|
| 2014/0108085 A1 | 4/2014 | Henriksen et al. |
| 2014/0164510 A1 | 6/2014 | Abuelsaad et al. |
| 2014/0278377 A1 | 9/2014 | Peters et al. |
| 2017/0134446 A1 | 5/2017 | Kitada et al. |
| 2018/0046957 A1 | 2/2018 | Yaari et al. |
| 2018/0218333 A1 | 8/2018 | Jenkins et al. |
| 2021/0367801 A1 | 11/2021 | Rajamani et al. |
| 2021/0399911 A1 | 12/2021 | Jorasch et al. |
| 2022/0284402 A1 | 9/2022 | Vangala et al. |

TOPIC RELEVANCE DETECTION IN VIDEO CONFERENCING

CROSS-REFERENCE TO RELATED APPLICATION(S)

This application is a continuation of U.S. patent application Ser. No. 17/443,950, filed Jul. 28, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services accessible over a network, such as the Internet, to deliver a complete communication experience regardless of physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
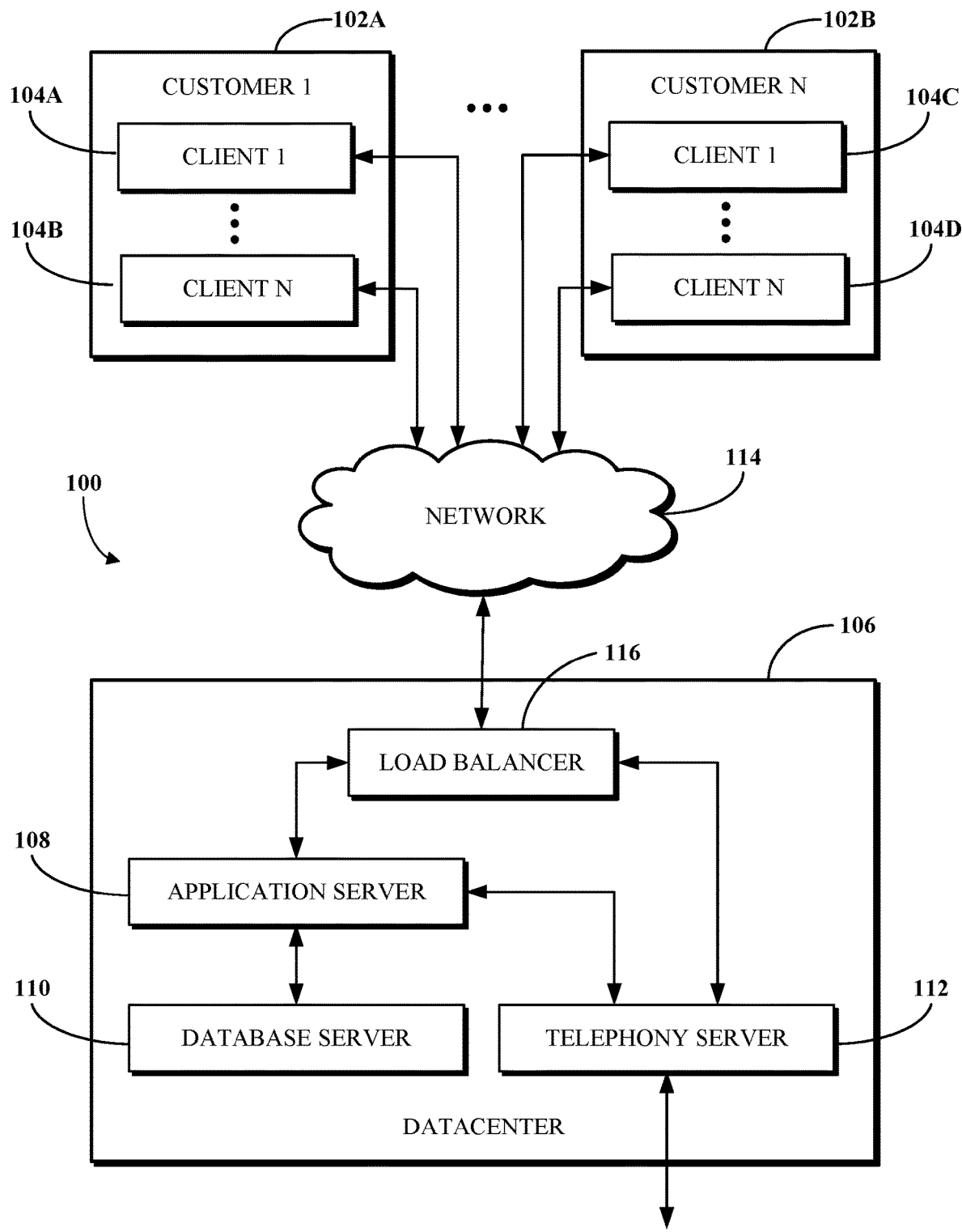
FIG. 1 is a block diagram of an example of an electronic computing and communications system.

Disclosed herein are, inter alia, implementations of systems and techniques for topic relevance detection using automated speech recognition.

One aspect of this disclosure is a method that may include generating a real-time transcription of a conference. The method may include detecting a topic based on the real-time transcription, a first discussion point related to the conference, or both. The topic may be unrelated to the first discussion point. The method may include determining two or more participants related to the topic. The method may include scheduling a future conference between the two or more determined participants. The method may include generating one or more discussion points for the future conference. The one or more discussion points may be based on the detected topic.

Another aspect of this disclosure is a server that includes one or more processors and a transmitter. The one or more processors may be configured to generate a real-time transcription of a conference. The one or more processors may be configured to detect a topic based on the real-time transcription, a first discussion point related to the conference, or both. The topic may be unrelated to the first discussion point. The one or more processors may be configured to determine two or more participants related to the topic. The one or more processors may be configured to schedule a future conference between the two or more determined participants. The one or more processors may be configured to generate one or more discussion points for the future conference. The one or more discussion points may be based on the detected topic. The transmitter may be configured to transmit an invite that indicates the future conference.

Another aspect of this disclosure is a non-transitory computer-readable medium comprising instructions stored on a memory, that when executed by a processor, cause the processor to generate a real-time transcription of a conference. The instructions, when executed by the processor, may cause the processor to detect a topic based on the real-time transcription, a first discussion point related to the conference, or both. The topic may be unrelated to the first discussion point. The instructions, when executed by the processor, may cause the processor to determine two or more participants related to the topic. The instructions, when executed by the processor, may cause the processor to obtain calendar data associated with the two or more determined participants. The instructions, when executed by the processor, may cause the processor to schedule a future conference between the two or more determined participants based on the calendar data. The instructions, when executed by the processor, may cause the processor to generate one or more discussion points related to the future conference. The one or more discussion points may be based on the detected topic.

A software platform, such as a UCaaS platform, may facilitate a conference between multiple participants. During a conference, a topic of discussion can often deviate from the intended purpose of the conference. In particular, it is not unusual for two or more participants to start a side conversation on a topic that is unrelated to a plan for the conference. The plan may include one or more discussion points for the conference. The discussion points may be predetermined topics for the conference. The side conversation between the two or more participants can be disruptive to the relevant topic discussion of the conference, and can potentially cause certain plan items to be either rushed or unfulfilled during the conference. For example, those participants may not realize how much of the conference time they have taken up with their side conversation. Conventional conference systems do not have the ability to detect a side conversation and alert the subject conference participants that they are off-topic. However, even where those participants are cognizant of their taking up valuable conference time, conventional conference systems do not provide a mechanism to automatically enable a later discussion for that side conversation.

Implementations of this disclosure address problems such as these by providing a conference system that detects when a topic not relevant to a conference is under discussion during the conference using an ASR process. The system detects the topic by processing a real-time transcription of the conference using a machine learning (ML) model trained for contextual awareness. The ML model may detect the topic by keyword processing that references one or more subjects within some context. The system identifies the participants who are discussing the detected topic, for example using metadata in the audio signals from each participant device. The system automatically generates a plan for a future conference to be attended by those identified participants in which the plan includes the detected topic. The plan for the future conference may include one or more discussion points for the future conference. The system may automatically schedule the future conference based on the availability of the identified participants by accessing calendar data of the identified participants.

To describe some implementations in greater detail, reference is first made to examples of hardware and software structures used to implement a system for topic relevance detection using ASR. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
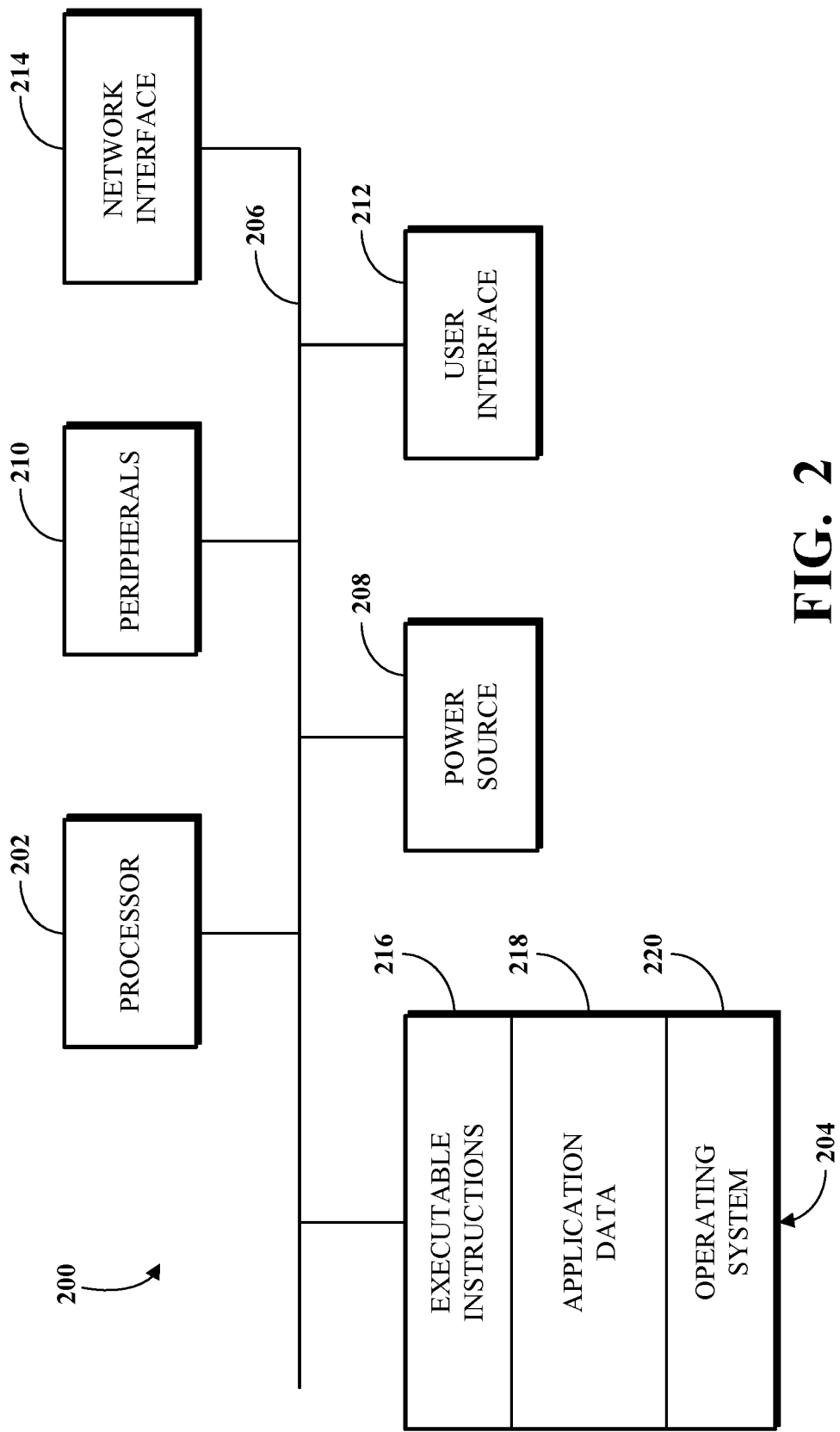
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
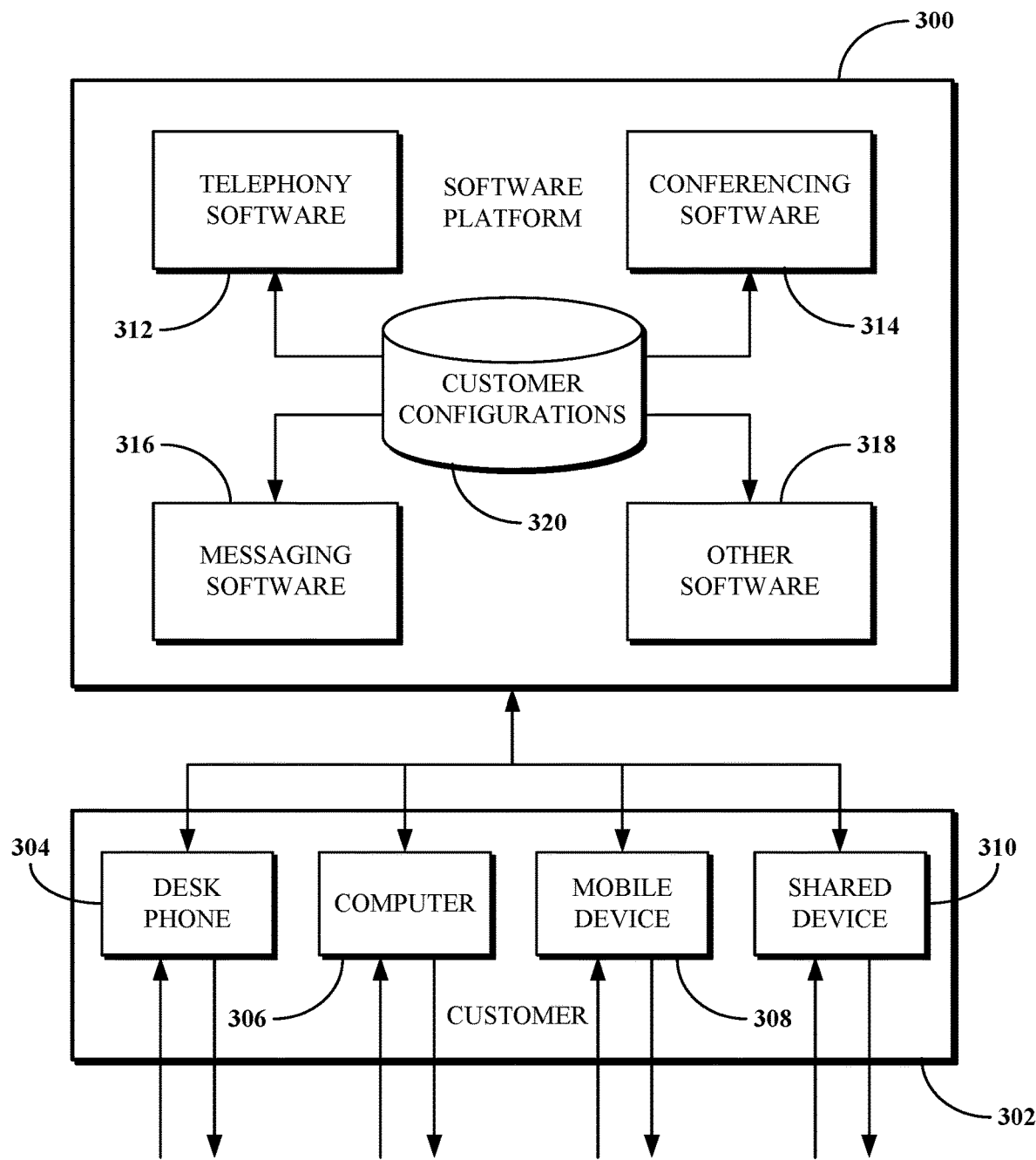
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include topic detection software to detect topic relevance in a conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
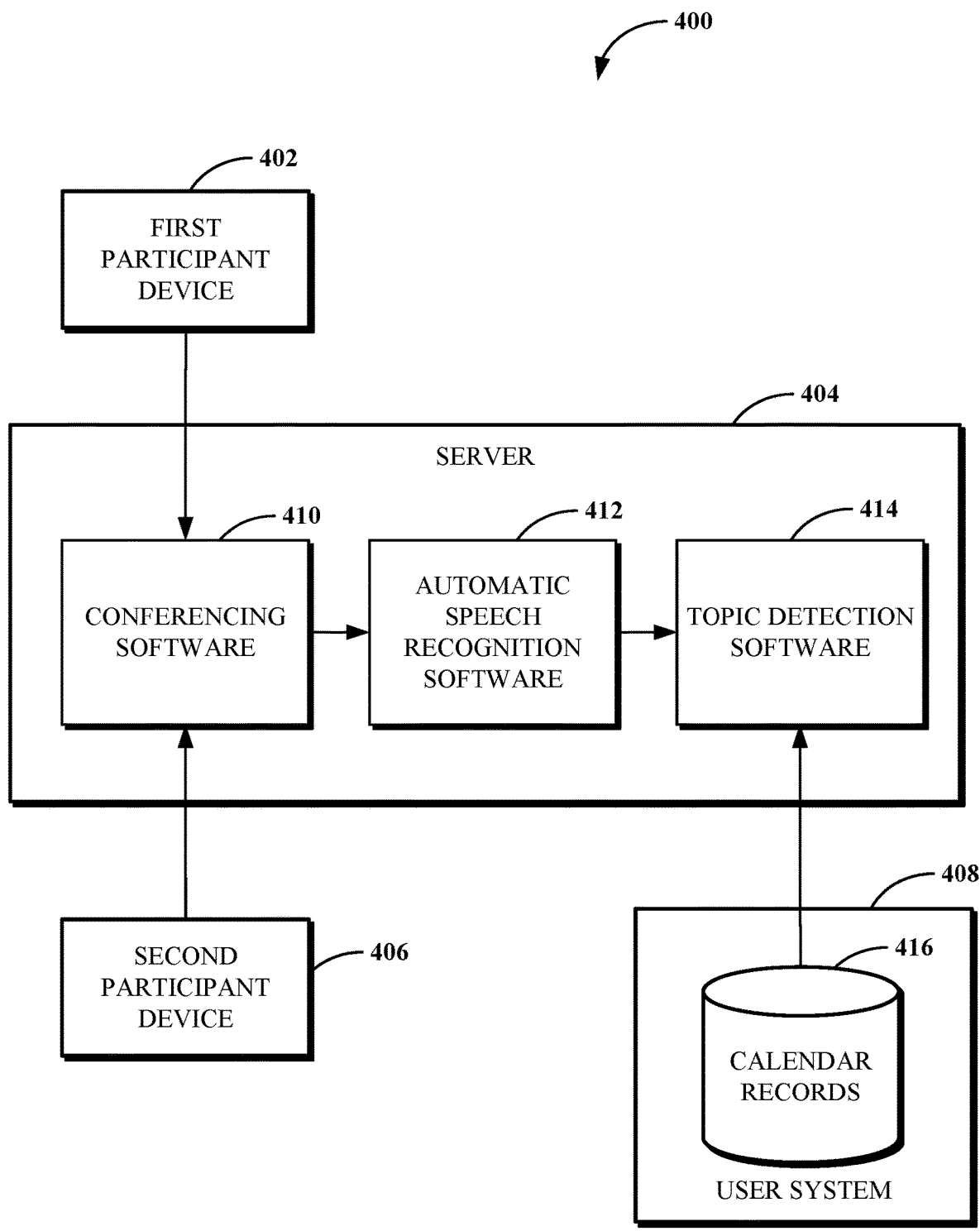
FIG. 4 is a block diagram of an example of a system for topic relevance detection using automated speech recognition (ASR).

FIG. 4 is a block diagram of an example of a system 400 for topic relevance detection using ASR. The system 400 includes a first participant device 402, a server 404, a second participant device 406, and a user system 408. The first participant device 402 and the second participant device 406 may each be any one of the clients 304 to 310 shown in FIG. 3; however, the first participant device 402 and the second participant device 406 do not need to be client devices. The server 404 may be used to implement at least a portion of the software platform 300 shown in FIG. 3. For example, the server 404 may be used to implement conferencing functionality of the software platform 300. In an example, the topic detection functionality may be implemented in the other software 318 shown in FIG. 3. The user system 408 may include a database server, such as the database server 110 shown in FIG. 1. In some examples, the user system 408 may be implemented as a component of the server 404.

The server 404 includes conferencing software 410, ASR software 412, and topic detection software 414. The conferencing software 410 may, for example, be the conferencing software 314 shown in FIG. 3. The conferencing software 410 is configured to enable audio, video, and/or other forms of conferences between multiple participants, such as a user of the first participant device 402 and a user of the second participant device 406. In this example, there may be additional participants in the conference that are not shown in FIG. 4 for simplicity and clarity. The ASR software 412 is a transcription engine that is configured to monitor an audio component of the conference, such as, for example, an audio channel used by the participant devices of the conference, including those participant devices not shown in FIG. 4, via the conferencing software 410. The audio signals from each participant device may include metadata that can be used to identify the participant. The metadata may include a participant account, a participant identification (ID), a caller ID associated with the participant device, or any other data that can be used to identify the participant.

The ASR software 412 is configured to monitor the audio signals from the conferencing software 410. The ASR software 412 may detect speech in the audio signals and convert the detected speech to text to generate a real-time transcription of the conference. The ASR software 412 may perform speech detection, voice recognition, audio channel processing, another form of audio processing, or any combination thereof. In some cases, the ASR software 412 may use a preset buffer delay. The ASR software 412 is configured to transmit the generated real-time transcription to the topic detection software 414. In some implementations, the ASR software 412 may be implemented other than at the server 404.

The topic detection software 414 is configured to receive the real-time transcription and process the real-time transcription using an ML model trained for contextual awareness. For example, the ML model may detect a topic by keyword processing that references one or more subjects within some context. The one or more subjects may be based on a plan for the conference, learned from previous conference plans, or both. In another example, the ML model may detect a phrase spoken by one or more participants suggesting that a further discussion of the topic be left for later (e.g., "let's take this discussion offline" or "we should chat about this later," and permutations of either). In the latter case, the ML model may detect the topic based on a determination of keywords within a neighboring word range of that phrase (e.g., within ten words preceding the phrase in the real-time transcription).

The topic detection software 414 may perform a semantic analysis on the real-time transcription to detect a topic in examples where two or more participants may be engaged in a side discussion without having spoken a keyword or phrase. The semantic analysis may be performed when a duration of time where a keyword or phrase is not detected exceeds a threshold. The semantic analysis may use ML algorithms to determine the topic, for example, based on previous conference topics. In some examples, the topic detection software 414 may prompt the participants engaged in the side discussion to confirm whether the side discussion is related to any of the discussion points. The confirmation responses from the participants may be used to learn new topics for use in performing future semantic analyses.

The topic detection software 414 may determine that the detected topic in a discussion between two or more participants is not related to any discussion point of the plan for the conference. For example, the topic detection software 414 may compare the detected topic to one or more discussion points of the plan for the conference to determine whether the detected topic matches any of the one or more discussion points. The system may use probabilistic matching to determine a statistical probability that the detected topic represents any one of the one or more discussion points. The detected topics may be stored and processed through ML algorithms for future use. If the detected topic does not match at least one of the discussion points, the topic detection software 414 determines that the detected topic is not related to any discussion point of the plan for the conference.

In this case, the topic detection software 414 identifies the participants who are discussing the detected topic that is not related to any discussion point of the plan for the conference, for example, using the metadata in the audio signals from each participant device. In some cases, the topic detection software 414 can use access privileges to access calendar records 416 of the user system 408. The topic detection software 414 may access the calendar records of the identified participants to automatically schedule a time for a future conference to discuss the topic that is not related to any discussion point of the plan. For example, the topic detection software 414 may determine a first available time for the identified participants based on existing appointments within their respective calendars. The topic detection software 414 may generate a new plan for the future conference, for example, based on the detected topic.

In some cases, an automated agent of the system 400, such as a voicebot that monitors audio content within the conference for certain configurable and extensible voice-based wake phrases may respond to a participant speaking a phrase such as "let's take this offline" by prompting the participant to indicate whether he or she desires for the system 400 to create, and optionally schedule, a future conference and plan for the detected topic. Prompting the participants may include the automated agent transmitting a notification to the identified participants. The notification may be displayed on a user interface (UI) of the first participant device 402, the second participant device 406, or both. In these cases, the topic detection software 414 may schedule the future conference or transmit invitations to the identified participants based on receiving a response to the notification indicating a confirmation from one or more participants.

Figure 5:
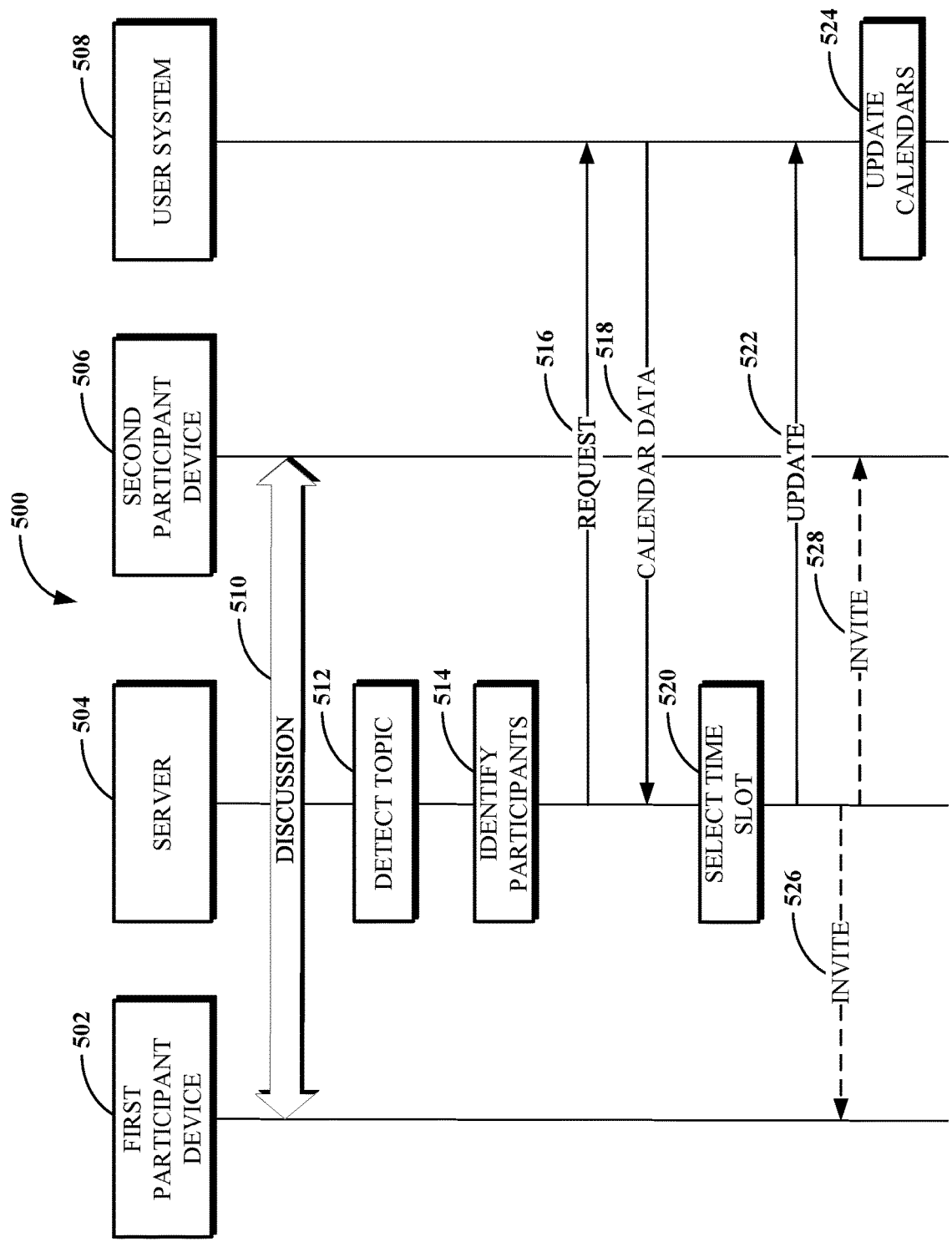
FIG. 5 is a swim lane diagram of an example of a system for topic relevance detection using ASR.

FIG. 5 is a swim lane diagram of an example of a system 500 for topic relevance detection using ASR. The system 500 includes a first participant device 502, a server 504, a second participant device 506, and a user system 508. The first participant device 502 and the second participant device 506 may each be any one of the devices 304 to 310 shown in FIG. 3. The server 504 may be the same as server 404 shown in FIG. 4, and may be used to implement the software platform 300 shown in FIG. 3. In an example, the topic detection functionality may be implemented in the other software 318 shown in FIG. 3. The user system 508 may be a database server, such as database server 110 shown in FIG. 1. In some examples, the user system 508 may be implemented as a component of the server 504.

In this example, a side discussion 510 is occurring between a user of the first participant device 502 and a user of the second participant device 506. In this example, there may be additional participants in the conference that are not shown in FIG. 5 for simplicity and clarity. The server 504 is configured to monitor an audio channel used by the participant devices of the conference including those participant devices not shown in FIG. 5. The audio signals from each participant device may include metadata that can be used to identify the participant. The metadata may include a participant account, a participant ID, a caller ID associated with the participant device, or any other data that can be used to identify the participant.

The server 504 may detect speech in the audio signals and convert the detected speech to text to generate a real-time transcription using an ASR process, which may include performing speech detection, voice recognition, audio channel processing, other audio processing, or any combination thereof. In some cases, a preset buffer delay may be used by the ASR process. The server 504 may process the real-time transcription using an ML model trained for contextual awareness to detect 512 a topic. For example, the ML model may detect 512 the topic by keyword processing that references one or more subjects. The one or more subjects may be based on a plan for the conference, learned from previous conference plans, or both. In another example, the ML model may detect a phrase spoken by one or more participants suggesting that a further discussion of the topic be left for later (e.g., "this is better saved for another discussion" and permutations thereof). In the latter case, the ML model may detect 512 the topic based on a determination of keywords within a neighboring word range of that phrase (e.g., within ten words preceding the phrase in the real-time transcription).

In this example, the server 504 may determine that the detected topic in the discussion 510 between the user of the first participant device 502 and the user of the second participant device 506 is not related to any discussion point of the plan for the conference. In this case, the server 504 identifies 514 the participants who are discussing the detected topic that is not related to any discussion point of the plan for the conference, for example, using the metadata in the audio signals from each participant device.

In response to identifying the participants who are discussing the detected topic that is not related to any discussion point of the plan for the conference, the server 504 transmits a request 516 to the user system 508. The request 516 may be a request to access calendar records stored in a database of the user system 508. The request 516 may indicate the identified participants. The user system 508 transmits calendar data 518 of the identified participants indicated in the request 516 to the server 504. The server 504 receives the calendar data 518 and selects 520 a time slot for a future conference to discuss the topic that is not related to any discussion point of the plan. The time slot may be determined based on a first available time slot for the identified participants based on existing appointments within their respective calendars.

In some examples, the server 504 may transmit an update 522 to automatically schedule the future conference based on the selected time slot. The update 522 may indicate the identified participants, the selected time slot, a plan based on the detected topic, or any combination thereof. The user system 508 is configured to receive the update 522 and update 524 the calendars of the identified participants to reflect the scheduled future conference. The calendars of the identified participants may be updated to include the plan based on the detected topic. In some implementations, the plan may include an audio component, a video component, or both, of the side discussion 510.

In some examples, in lieu of transmitting the update 522, the server 504 may transmit an invite 526 to the first participant device 502 and an invite 528 to the second participant device 506. The invite 526 and the invite 528 may indicate the selected time slot, the plan based on the detected topic, or both.

In some implementations, an automated agent of the system 500, such as a voicebot that monitors audio content within the conference for certain configurable and extensible voice-based wake phrases may respond to a participant speaking a phrase such as "let's take this offline" by prompting the participant to indicate whether he or she desires for the system 500 to create, and optionally schedule, a future conference and plan for the detected topic. Prompting the participants may include the automated agent transmitting a notification to the identified participants. The notification may be displayed on a UI of the first participant device 502, the second participant device 506, or both. In these cases, the server 504 may schedule the future conference or transmit invitations to the identified participants based on receiving a response to the notification indicating a confirmation from one or more participants.

Figure 6:
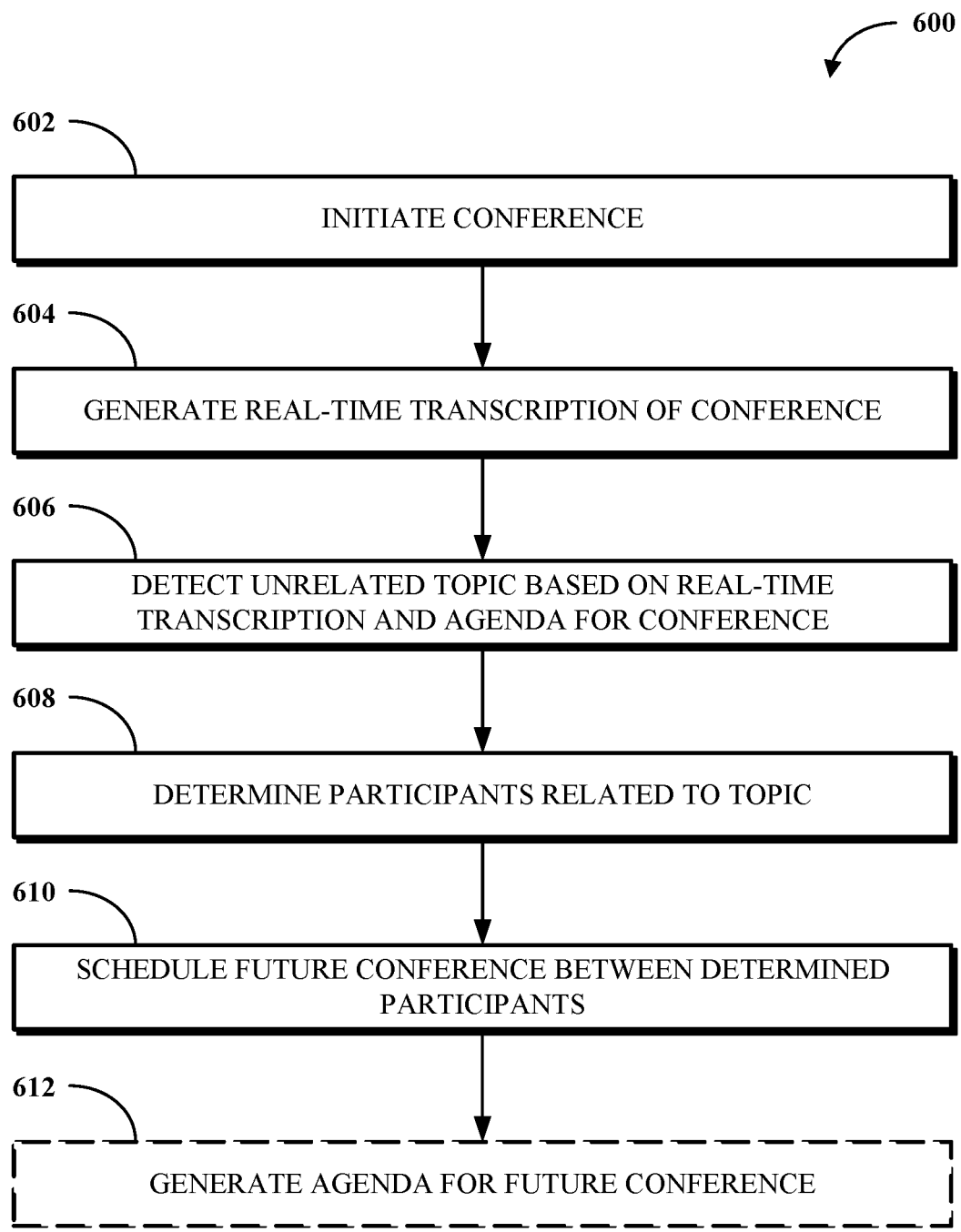
FIG. 6 is a flowchart of an example of a method for topic relevance detection using ASR.
Figure 7:
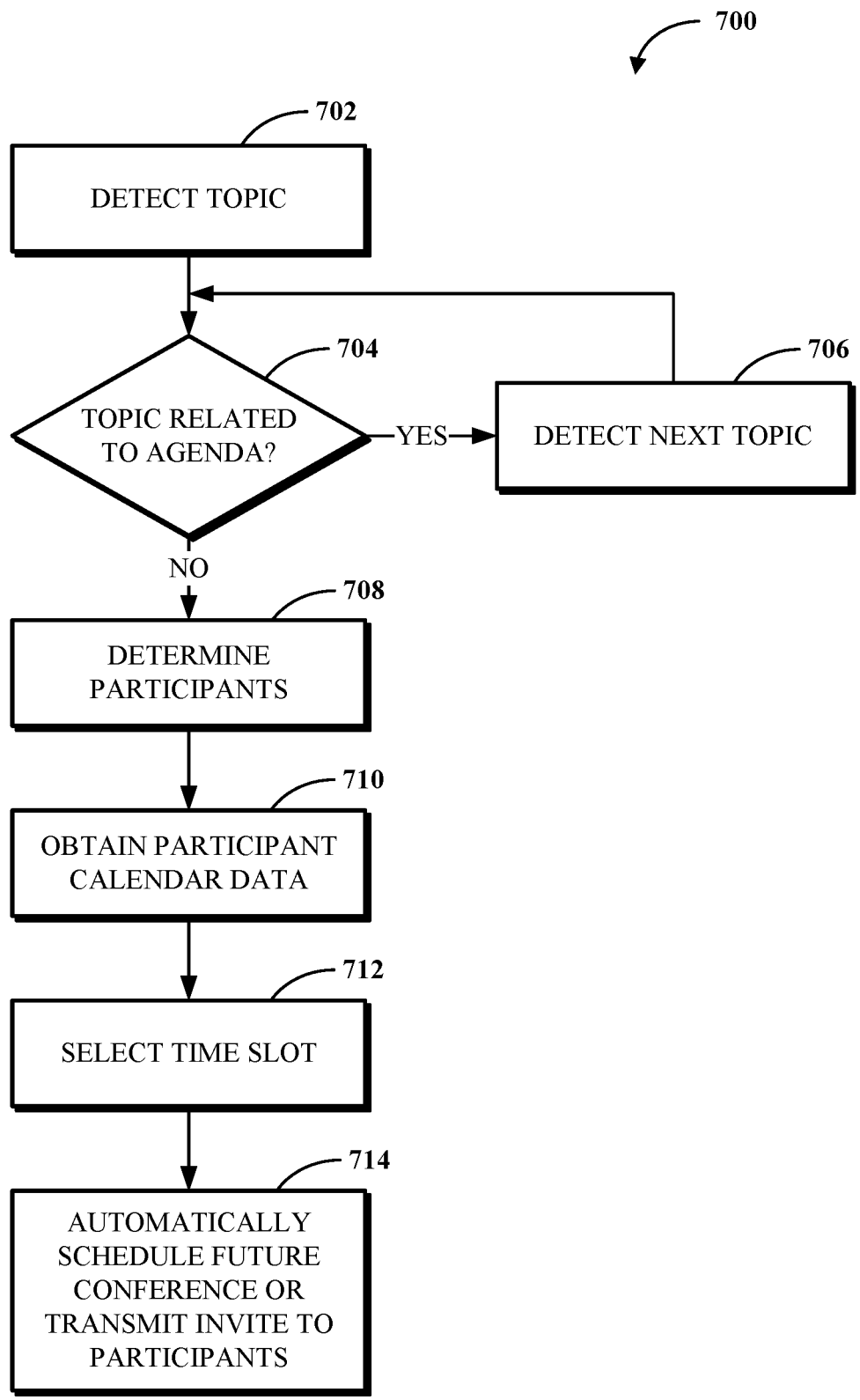
FIG. 7 is a flowchart of an example of another method for topic relevance detection using ASR.

To further describe some implementations in greater detail, reference is next made to examples of methods that may be performed by or using a system for topic relevance detection using ASR. FIGS. 6 and 7 are flowcharts of examples of methods for detecting topic relevance in a conference. The methods can be executed using computing devices, such as the systems, hardware, and software described with respect to FIGS. 1-5. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 6 is a flowchart of an example of a method 600 for topic relevance detection using ASR. At 602, a conference is initiated with multiple participants. In this example, at some time during the conference, two or more participants may initiate a side discussion that is not related to any discussion point of a plan for the current conference.

At 604, the method 600 includes generating a real-time transcription of the conference. Generating the real-time transcription of the conference may include detecting speech in the audio signals from participant devices and converting the detected speech to text to generate the real-time transcription using an ASR process, which may include performing speech detection, voice recognition, audio channel processing, other audio processing, or any combination thereof. In some cases, a preset buffer delay may be used by the ASR process.

At 606, the method 600 includes detecting an unrelated topic to the conference. The unrelated topic may be detected based on the real-time transcription and a plan for the conference, where the plan includes one or more discussion points. The real-time transcription may be processed using an ML model trained for contextual awareness to detect the unrelated topic. For example, the ML model may detect the unrelated topic by keyword processing that references one or more subjects. The one or more subjects may be based on the one or more discussion points of the plan for the conference, learned from previous conference plans, or both. In another example, the ML model may detect a phrase spoken by one or more participants suggesting that a further discussion of the unrelated topic be left for later (e.g., "this is better saved for another discussion" and permutations thereof). In the latter case, the ML model may detect the unrelated topic based on a determination of keywords within a neighboring word range of that phrase (e.g., within ten words preceding the phrase in the real-time transcription).

At 608, the method 600 includes determining participants related to the unrelated topic. Determining the participants related to the unrelated topic includes identifying the participants who are discussing the unrelated topic using metadata in the audio signals from each participant device. For example, determining the participants related to the unrelated topic may include using voice matching such as by processing audio frequency information representative of voice content from those participants during the conference to uniquely identify conference participants based on such voice content.

At 610, the method 600 includes scheduling a future conference between the determined participants. In some implementations, scheduling the future conference between the determined participants may include automatically updating calendars, for example, by adding the future conference to the respective calendars of the determined participants based on an availability of the determined participants. In some implementations, scheduling the future conference between the determined participants may include automatically transmitting invites to the determined participants. The invites include a time slot that may be based on the availability of the determined participants.

In some implementations, the method 600 may include generating a plan for the future conference at 612. Generating the plan for the future conference may include determining one or more discussion points based on the unrelated topic detected at 606. In some implementations, the generated plan may include an audio component, a video component, or both, of the side discussion. The generated plan can be included in the invites, the updated calendars, or both.

FIG. 7 is a flowchart of an example of another method 700 for topic relevance detection using ASR. At 702, the method 700 includes detecting a topic. The topic may be detected based on a real-time transcription of the conference. The real-time transcription may be processed using an ML model trained for contextual awareness to detect the topic.

At 704, the method 700 includes determining whether the topic is related to one or more discussion points of a plan for the conference. For example, the ML model may be used to determine whether the topic is related to the plan by keyword processing that references one or more subjects. The one or more subjects may be based on one or more discussion points of the plan for the conference, learned from previous conference plans, or both. In another example, the ML model may detect a phrase spoken by one or more participants suggesting that a further discussion of the topic be left for later (e.g., "let's discuss this at another time" and permutations thereof). In the latter case, the ML model may determine whether the topic is related to the plan based on a determination of keywords within a neighboring word range of that phrase (e.g., within ten words preceding the phrase in the real-time transcription). If it is determined at 704 that the topic is related to one or more discussion points of the plan, the method 700 include detecting the next topic at 706.

If it is determined at 704 that the topic is not related to one or more discussion points of the plan, the method 700 includes determining participants related to the topic at 708. Determining the participants related to the topic includes identifying the participants who are discussing the topic, for example, using metadata in the audio signals from each participant device.

At 710, the method 700 includes obtaining participant calendar data. Obtaining the participant calendar data may include transmitting a request to a user system that includes a database of calendar records. The request may be a request to access the calendar records stored in the database of the user system and receiving a response that includes calendar data of the identified participants. The request may indicate the identified participants.

At 712, the method 700 includes selecting a time slot for a future conference to discuss the topic that is not related to any discussion point of the plan. The time slot may be selected based on the received response that includes the calendar data of the identified participants. For example, the time slot may be selected based on a first available time slot for the identified participants based on existing appointments within their respective calendars.

At 714, the method 700 includes automatically scheduling a future conference between the identified participants or transmitting an invite to each identified participant. Automatically scheduling the future conference between the identified participants may include automatically updating calendars, for example, by adding the future conference to the respective calendars of the identified participants based on an availability of the determined participants. In implementations where invites are transmitted to each identified participant, the invites include the selected time slot.

In some implementations, a plan for the future conference may be generated. Generating the plan for the future conference may include determining one or more discussion points based on the topic determined to be unrelated to any discussion points of the plan. In some implementations, the plan may include an audio component, a video component, or both, of the side discussion. The generated plan can be included in the invites, the updated calendars, or both.

An aspect may include a method that includes determining that a topic of a conference is unrelated to discussion points of the conference. The method may include transmitting a prompt to participants related to the topic to confirm that the topic is unrelated to the discussion points. The method may include generating a future discussion point based on the topic responsive to receiving one or more confirmation responses. The method may include adding a future conference to respective calendars of the participants related to the topic as calendar entries including the future discussion point.

An aspect may include a system that comprises a server. The server may be configured to determine that a topic of a conference is unrelated to discussion points of the conference. The server may be configured to transmit a prompt to participants related to the topic to confirm that the topic is unrelated to the discussion points. The server may be configured to generate a future discussion point based on the topic responsive to receiving one or more confirmation responses. The server may be configured to add a future conference to respective calendars of the participants related to the topic as calendar entries including the future discussion point.

An aspect may include a non-transitory computer-readable medium comprising instructions stored on a memory, that when executed by a processor, cause the processor to determine that a topic of a conference is unrelated to discussion points of the conference. The processor may be configured to transmit a prompt to participants related to the topic to confirm that the topic is unrelated to the discussion points. The processor may be configured to generate a future discussion point based on the topic responsive to receiving one or more confirmation responses. The processor may be configured to add a future conference to respective calendars of the participants related to the topic as calendar entries including the future discussion point.

In one or more aspects, a ML model may be used to process a transcription to determine that the topic of the conference is unrelated. In one or more aspects, the transcription may be a real-time transcription. In one or more aspects, the ML model may be trained for contextual awareness. In one or more aspects, the topic may be determined based on a keyword. In one or more aspects, the keyword may reference one or more subjects. In one or more aspects, a phrase may be detected based on the transcription and/or discussion points related to the conference. In one or more aspects, the topic may be determined based on one or more keywords within a neighboring word range of a phrase. In one or more aspects, the topic may be determined by performing a semantic analysis on the transcription. In one or more aspects, the semantic analysis may be performed when a duration of time that a keyword or phrase is not detected meets a threshold. In one or more aspects, the calendar entries may include an audio portion or a video portion of the conference associated with the future discussion point.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   detecting a phrase based on a real-time transcription and discussion points of a conference;
   determining a topic based on keywords within a neighboring word range of the phrase;
   determining that the topic of the conference is unrelated to the discussion points of the conference by processing the real-time transcription using a machine learning (ML) model trained for contextual awareness;
   transmitting a prompt to participants related to the topic to confirm that the topic is unrelated to the discussion points;
   generating a future discussion point based on the topic responsive to receiving one or more confirmation responses; and
   adding a future conference including the future discussion point to respective calendars of the participants related to the topic.

2. The method of claim 1, wherein the ML model is configured to detect that a further discussion is to be left for a later time.

3. The method of claim 1, wherein determining the topic is based on a keyword that references one or more subjects.

4. The method of claim 3, wherein the one or more subjects is based on a plan for the conference.

5. The method of claim 1, wherein the respective calendars include an audio portion of the conference.

6. The method of claim 1, wherein determining the topic includes performing a semantic analysis on the real-time transcription.

7. The method of claim 1, wherein determining the topic includes performing a semantic analysis on the real-time transcription when a threshold is met for a duration of time that a keyword or phrase is not detected.

8. The method of claim 1, wherein the respective calendars include a video portion of the conference associated with the future discussion point.

9. A system comprising:
a server configured to:
detect a phrase based on a real-time transcription and discussion points of a conference;
determine a topic based on keywords within a neighboring word range of the phrase;
process the real-time transcription using a machine learning (ML) model trained for contextual awareness to determine that the topic of the conference is unrelated to the discussion points of the conference;
transmit a prompt to participants related to the topic to confirm that the topic is unrelated to the discussion points;
generate a future discussion point based on the topic responsive to receiving one or more confirmation responses; and
add a future conference that includes the future discussion point to respective calendars of the participants related to the topic.

10. The system of claim 9, wherein the ML model is configured to detect that a further discussion of the topic is to be left for a later time.

11. The system of claim 9, wherein the server is configured to determine the topic based on a keyword that references one or more subjects.

12. The system of claim 11, wherein the one or more subjects is based on a plan for the conference.

13. The system of claim 11, wherein the one or more subjects is learned from a previous conference plan.

14. The system of claim 9, wherein the server is configured to perform a semantic analysis on the real-time transcription to determine the topic.

15. A non-transitory computer-readable medium comprising instructions stored on a memory, that when executed by a processor, cause the processor to:
detect a phrase based on a real-time transcription and discussion points of a conference;
determine a topic based on keywords within a neighboring word range of the phrase;
process the real-time transcription using a machine learning (ML) model trained for contextual awareness to determine that the topic of the conference is unrelated to the discussion points of the conference;
transmit a prompt to participants related to the topic to confirm that the topic is unrelated to the discussion points;
generate a future discussion point based on the topic responsive to receiving one or more confirmation responses; and
add a future conference that includes the future discussion point to respective calendars of the participants related to the topic.

16. The non-transitory computer-readable medium of claim 15, wherein the ML model is configured to detect that a further discussion of the topic is to be left for a later time.

17. The non-transitory computer-readable medium of claim 15, wherein the instructions, when executed by the processor, cause the processor to determine the topic based on a keyword that references at least one subject.

18. The non-transitory computer-readable medium of claim 17, wherein the at least one subject is based on a plan for the conference.

19. The non-transitory computer-readable medium of claim 17, wherein the at least one subject is learned from a previous conference plan.

20. The non-transitory computer-readable medium of claim 15, wherein the respective calendars include an audio portion of the conference.

* * * * *